(12) United States Patent
Kawada et al.

(10) Patent No.: US 6,801,252 B1
(45) Date of Patent: Oct. 5, 2004

(54) ELECTRONIC ZOOMING CIRCUIT

(75) Inventors: Shingo Kawada, Yokosuka (JP);
Hiroshi Nishiyama, Ninomiya-machi (JP); Norio Kurashige, Yokohama (JP)

(73) Assignee: Victor Company of Japan, Ltd. (JP)

( * ) Notice: Subject to any disclaimer, the term of this patent is extended or adjusted under 35 U.S.C. 154(b) by 0 days.

(21) Appl. No.: 09/474,104

(22) Filed: Dec. 29, 1999

(30) Foreign Application Priority Data

Jan. 20, 1999 (JP) .......................................... 11-011540

(51) Int. Cl.⁷ ............................................. H04N 5/262
(52) U.S. Cl. ................................................. 348/240.2
(58) Field of Search ..................... 348/240.99, 240.1, 348/240.2, 294, 295, 296, 312, 222.1; 382/298

(56) References Cited

U.S. PATENT DOCUMENTS

| | | | | |
|---|---|---|---|---|
| 5,019,912 A | * | 5/1991 | Matsuda | 348/240.2 |
| 5,227,863 A | * | 7/1993 | Bilbrey et al. | 348/578 |
| 5,243,433 A | * | 9/1993 | Hailey | 348/240.2 |
| 5,406,334 A | * | 4/1995 | Kondo et al. | 348/581 |
| 5,602,870 A | * | 2/1997 | Hailey et al. | 375/230 |
| 5,963,675 A | * | 10/1999 | van der Wal et al. | 382/260 |
| 6,522,360 B1 | * | 2/2003 | Miyawaki et al. | 348/347 |
| 6,542,201 B1 | * | 4/2003 | Song et al. | 348/561 |

* cited by examiner

*Primary Examiner*—Wendy R. Garber
*Assistant Examiner*—Matthew L Rosendale
(74) *Attorney, Agent, or Firm*—Connolly Bove Lodge & Hutz LLP

(57) ABSTRACT

In a case that a zooming magnification is less than 2 times, the switch (SW) is connected to the terminal "a" and a zooming process in the horizontal direction is performed when reading out from the line memory (13) in conjunction with performing the zooming process in the vertical direction in the CCD (10). Further, in a case that the zooming magnification is more than 2 times, the switch (SW) is connected to the terminal "b" and the zooming process in the horizontal direction is performed with combining occasions when reading out from the memory (12) and reading out from the line memory (13) in conjunction with performing the zooming process in the horizontal direction when reading out from the memory (12).

3 Claims, 4 Drawing Sheets

ELECTRONIC ZOOMING CIRCUIT

BACKGROUND OF THE INVENTION

1. Field of the Invention

The present invention relates to an electronic zooming circuit, which is suitable for utilizing in an apparatus such as a single-unit video camera-recorder.

2. Description of the Related Art

FIG. 3 shows an electronic zooming circuit of the prior art. In FIG. 3, CCD signals outputted from a solid state image sensing device 30, hereinafter called a CCD 30, are processed in a signal processor 31 with a predetermined signal processing method and a video signal of one field is wrote in a field memory 32. A readout address in response to a magnification of electronic zooming is assigned by such a device as a CPU (not shown) and each image signal for one line is read out in accordance with the readout address.

FIGS. 4(a) through 4(d) show that an image composed of n/2 lines in the middle of a picture composed of "n" lines is enlarged while the picture is doubled by a zooming process in horizontal and vertical directions. FIG. 4(a) shows an original video signal of one field written in the field memory 32. FIG. 4(b) shows a video signal of one field outputted from the field memory 32. The video signal is enlarged by 2 times in the vertical direction.

Since image signals of lines within a specific vertical range of a picture are repeatedly outputted twice from the field memory 32, when the double zooming process is performed in the vertical direction, vertical resolution of a picture outputted from the field memory 32 is deteriorated to one half of that of the picture written in the field memory 32.

Image signals outputted from the field memory 32 are written in a line memory 33, line by line. A readout address in accordance with a magnification of electric zooming is assigned by the CPU (not shown) and each image signal for one pixel is read out from the line memory 33 in accordance with the readout address.

Since image signals of pixels in a specific horizontal range of a picture are repeatedly outputted from the line memory 33 twice as shown in FIG. 4(c), horizontal resolution of a picture outputted from the line memory 33 is deteriorated to one half of that of the picture written in the line memory 33.

Accordingly, image signals obtained as mentioned above are sequentially processed with interpolation by an interpolation circuit 34 and a video signal of one field, which is processed with interpolation in horizontal and vertical directions, is produced as shown in FIG. 4(d).

In the electronic zooming circuit of the prior art as mentioned above, however, it is necessary for the electronic zooming circuit of the prior art to provide an expensive memory having a capacity of more than one field in the previous stage of the interpolation circuit 34. Accordingly, it is difficult to constitute a less expensive electronic zooming circuit.

SUMMARY OF THE INVENTION

Accordingly, in consideration of the above-mentioned problems of the prior art, an object of the present invention is to provide an electronic zooming circuit in a less expensive cost.

In order to achieve the above object, the present invention provides, according to an aspect thereof, an electronic zooming circuit obtaining an enlarged image from an original image in which one field is composed of N lines by enlarging only an area within predetermined horizontal and vertical ranges of the original image, the electronic zooming circuit comprising a solid state image sensing device of outputting a video signal of N lines in total within a period of one field by outputting an image signal of a predetermined line repeatedly during the period of one field, a memory of being written with image signals of a plurality of pixels including at least all pixels allocated within said predetermined horizontal range and being not written with an image signal of a same line repeatedly while writing said video signal of N lines outputted from the solid sate image sensing device, wherein only image signals of lines equivalent to the predetermined vertical range are repeatedly read out from the memory in accordance with a zooming magnification, a line memory of being written with an image signal of one line, wherein only an image signal of pixels equivalent to the predetermined horizontal range is repeatedly read out from the line memory in accordance with the zooming magnification and a interpolation circuit of obtaining the enlarged image by interpolating the video signal of N lines in the horizontal and vertical directions. The electronic zooming circuit is further characterized by that the solid state image sensing device repeatedly outputs only an image signal of lines equivalent to said predetermined vertical range within the period of one field when the zooming magnification is less than N/M times, where M and N are respectively a natural number and M is smaller than N, and inputs the image signal from the solid state image sensing device into the interpolation circuit after performing a zooming process in the line memory, and characterized by that the solid state image sensing device repeatedly outputs a video signal of M lines including at lest all lines in the predetermined vertical range within the period of one field when the zooming magnification is more than N/M times.

Furthermore, the electronic zooming circuit is characterized by that a value of the N/M is assigned to 2.

Other object and further features of the present invention will be apparent from the following detailed description when read in conjunction with the accompanying drawings.

DETAILED DESCRIPTION OF THE PREFERRED EMBODIMENTS

Embodiment

Figures 1, 3:
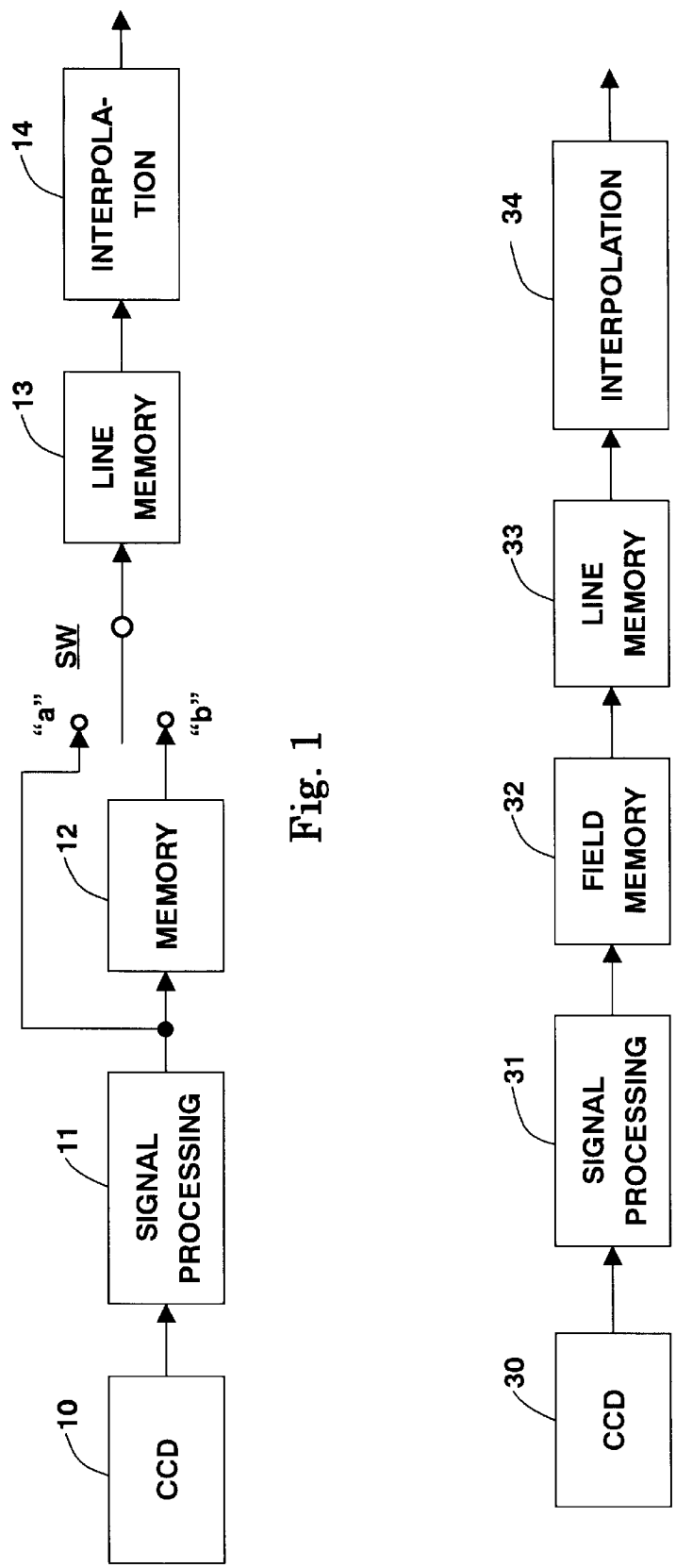
FIG. 1 shows a block diagram of an electronic zooming circuit according to an embodiment of the present invention.
FIG. 3 shows a block diagram of an electronic zooming circuit according to the prior art.

FIG. 1 shows a block diagram of an electronic zooming circuit according to an embodiment of the present invention. In FIG. 1, the electronic zooming circuit comprises a solid state image sensing device 10 having a vertical zooming mechanism, hereinafter called a CCD 10, a signal processor 11, a memory 12, a switch SW, a line memory 13 and a interpolation circuit 14. The vertical zooming mechanism is inherent to the CCD 10. However, the CCD 30 of the prior art is not furnished with the vertical zooming mechanism.

The CCD 10 is depicted first. The CCD 10 is furnished with a function of outputting only a signal of a predetermined line in the vertical direction of a picture repeatedly a plurality of times, if necessary, in accordance with a magnification of an electronic zooming on the basis of a control signal outputted from a CPU (not shown) or like.

Figure 2A:
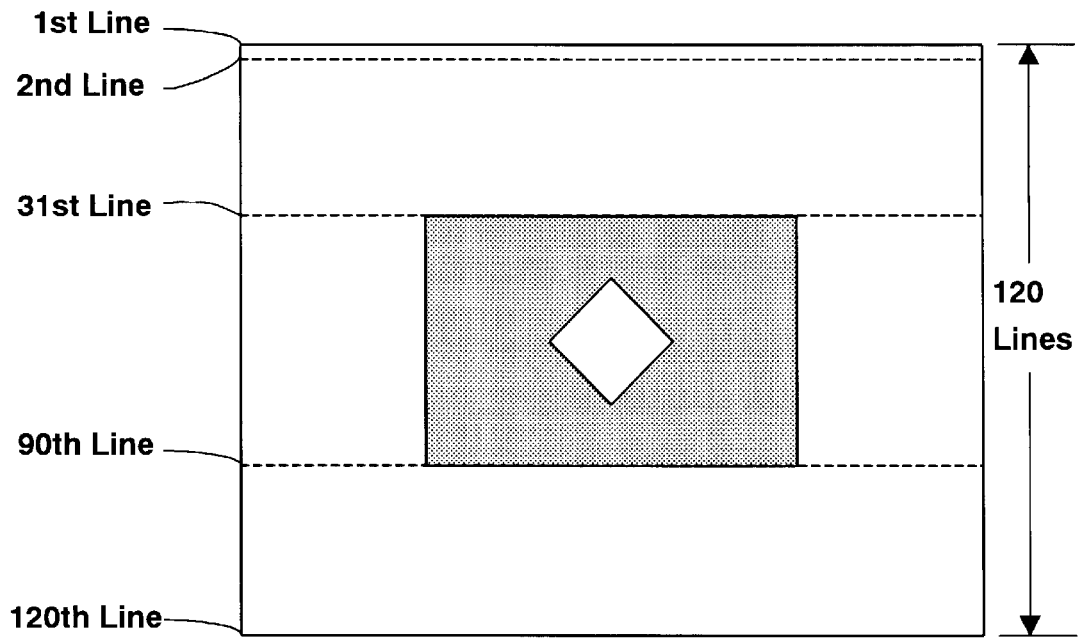
FIG. 2(a) shows an original image of a video signal of one field according to the embodiment of the present invention, wherein a shaded area in the middle of the original image will be enlarged or zoomed.
Figure 2B:
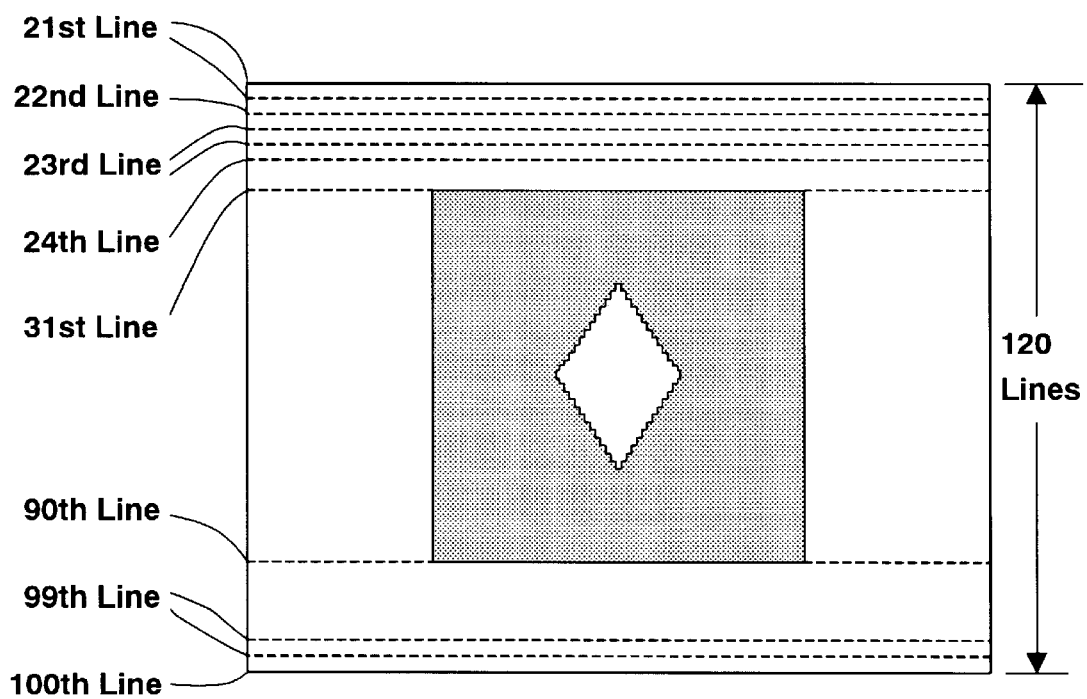
FIG. 2(b) shows an image signal of which a shaded area is processed by a magnification of 1.5 times zooming in the vertical direction of the original image shown in FIG. 2(a).
Figure 2C:
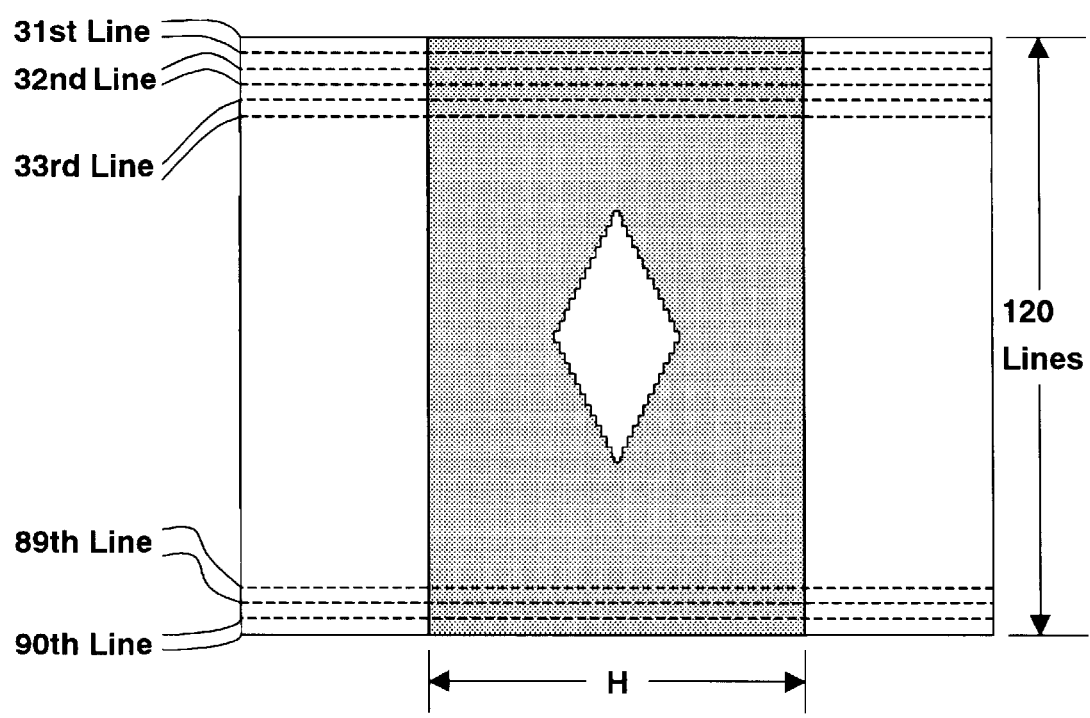
FIG. 2(c) shows an image signal of which a shaded area is processed by a magnification of 2 times zooming in the vertical direction of the original image shown in FIG. 2(a).

FIGS. 2(a) through 2(c) show that a video signal of one field outputted from the CCD 10 is enlarged or zoomed by a certain zooming magnification in the vertical direction of an original image. FIG. 2(a) shows the original image signal composed of 120 lines, which is not zoomed in the vertical direction, wherein a shaded area composed of total 60 lines from a 31st line to a 90th line in the vertical direction will be enlarged or zoomed. FIG. 2(b) shows an image signal in which the vertical direction of the original image signal shown in FIG. 2(a) is enlarged or zoomed by 1.5 times. FIG. 2(c) shows an image signal in which the vertical direction of the original image signal is zoomed by 2 times. In these drawings, a number of lines in one field are defined as 120 lines for easier understanding. However, a number of lines in one field are not necessary to be defined as 120, any numbers are applicable.

In a case that the CCD 10 does not perform a zooming process in the vertical direction of a picture, the CCD 10 outputs an image signal of each line from a first line to a 120th line equivalent to one field as shown in FIG. 2(a), line by line. On the other hand, in a case that the CCD 10 performs a zooming process in the vertical direction of the picture, the CCD 10 repeatedly outputs only a signal of a predetermined line in the vertical direction of the picture as shown in FIGS. 2(b) and 2(c) in accordance with a magnification of zooming.

In other words, in a case of performing a zooming process of a magnification of 1.5 times, some image signals at some lines out of image signals contained in lines from a 21st line to a 100th line are outputted twice such that twice the 21st line, once a 22nd line, twice a 23rd line, once a 24th line, twice a 99th line and once the 100th line as shown in FIG. 2(b) and image signals of 120 lines are outputted in total. In addition thereto, the shaded area enlarged by 1.5 times shown in FIG. 2(b) is composed of 90 lines in total.

Further, in a case of performing a zooming process of a magnification of 2 times, some image signals of some lines out of image signals from a 31st line to a 90th line are outputted twice such that twice the 31st line, twice a 32nd line, twice a 33rd line, twice a 89th line and twice the 90th line and image signals of 120 lines are outputted in total as shown in FIG. 2(c).

Accordingly, the CCD 10 outputs image signals of 120 lines in total. However, in a case of performing a zooming process of a magnification exceeding one, actual information of original image signals are not fully presented for 120 lines because image signals of same lines are outputted twice. Further, a control signal from the CPU (not shown) or like controls lines of which image signals shall be repeatedly outputted in accordance with a magnification of electronic zooming. Furthermore, a zooming magnification in the vertical direction of a picture is limited to less than 2 times.

A video signal of one field outputted from the CCD 10 is processed with a predetermined signal processing method in the signal processor 11 and outputted from the signal processor 11, line by line. However, the image signals outputted from the signal processor 11 are processed in different processes in accordance with a zooming magnification whether the magnification is less than 2 times or more than 2 times.

A zooming magnification of 1.5 times is explained first as one example that a magnification of electronic zooming is less than 2 times. In FIG. 1, the switch SW is in an "a" position and an image signal, which is outputted from the signal processor 11 line by line, is written in the line memory 13. A readout address in accordance with a magnification of electronic zooming is assigned by the CPU (not shown) or like and each image signal for one pixel is read out from the line memory 13 in accordance with the readout address.

In other words, in a case of performing an electronic zooming of a magnification of 1.5 times, a image signal, which is performed by a zooming magnification of 1.5 times in the vertical direction of the picture as shown in FIG. 2(b), is outputted from the CCD 10. The image signal is processed by a zooming magnification of 1.5 times in the horizontal direction of the picture and inputted to the interpolation circuit 14 when the image signal is read out from the line memory 13.

Next, a zooming magnification of 2 times is explained as a first example of that a magnification of electronic zooming is more than 2 times. The switch SW is in a "b" position. Only a part of image signals, which are outputted from the signal processor 11 line by line, is written in the memory 12. Wherein a memory capacity of the memory 12 is one quarter of that of the field memory 32 in the prior art shown in FIG. 3. An image signal, which is processed by a zooming magnification of 2 times in the vertical direction of the picture as shown in FIG. 2(c), is outputted from the CCD 10.

Writing each image signal of one line, which is outputted from the signal processor 11, into the memory 12 is controlled by the CPU (not shown) or like. Image signals of pixels in a predetermined horizontal range "H" of the picture shown in FIG. 2(c) are written in the memory 12. A writing address of an image signal of a same line shown in FIG. 2(c) is assigned so as to overwrite the image signal of the same line in the memory 12.

When an image signal is read out from the memory 12, a readout address is controlled by the CPU (not shown) or like. An image signal of a same pixel is outputted twice in conjunction with outputting an image signal of a same line twice. In other words, an image signal from the signal processor 11 is processed by a zooming magnification of 2 times in the horizontal and vertical directions when the image signal is read out from the memory 12. Accordingly, the image signal outputted from the memory 12 is written in the line memory 13 thereafter, and inputted to the interpolation circuit 14 without a zooming process in the horizontal direction of the picture when the image signal is read out from the line memory 13.

A zooming magnification of 4 times is explained as a second example of that a magnification of electronic zooming is more than 2 times. The switch SW is in a "b" position. Only a part of image signals, which are outputted from the signal processor 11 line by line, is written in the memory 12. The CCD 10 outputs an image signal, which is processed by a zooming magnification of 2 times in the vertical direction of the picture shown in FIG. 2(c), as a same manner as processed by a zooming magnification of 2 times.

Writing an image signal, which is outputted from the signal processor 11 line by line, into the memory 12 is controlled by the CPU (not shown) or like. Only image signals of pixels in the predetermined horizontal range "H" of the picture shown in FIG. 2(c) are written in the memory 12. A writing address of an image signal of a same line shown in FIG. 2(c) is assigned so as to overwrite the image signal of the same line in the memory 12.

The CPU (not shown) or like controls a readout address when an image signal is read out from the memory 12. An image signal of a same pixel is outputted twice in conjunction with outputting an image signal of a same line 4 times repeatedly. In other words, an image signal from the signal processor 11 is processed by a zooming magnification of 2 times in the horizontal direction and 4 times in the vertical direction when the image signal is read out from the memory 12. Accordingly, the image signal outputted from the memory 12 is written in the line memory 13 thereafter, and inputted into the interpolation circuit 14 after processed by a zooming magnification of 2 times furthermore in the horizontal direction of the picture when the image signal is read out from the line memory 13.

Figure 4A:
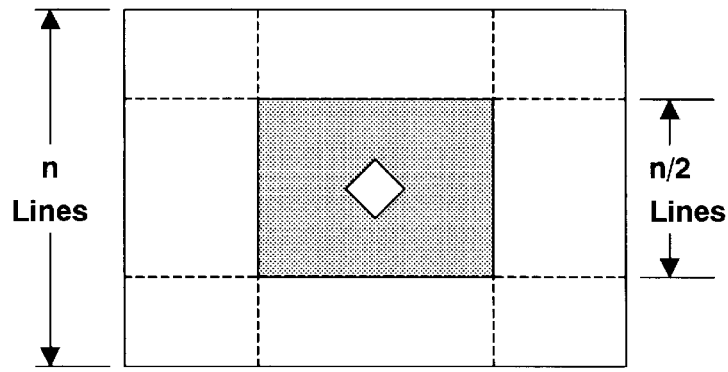
FIG. 4(a) shows an original image signal stored in a field memory according to the prior art, wherein a shaded area in the middle will be enlarged or zoomed.
Figure 4B:
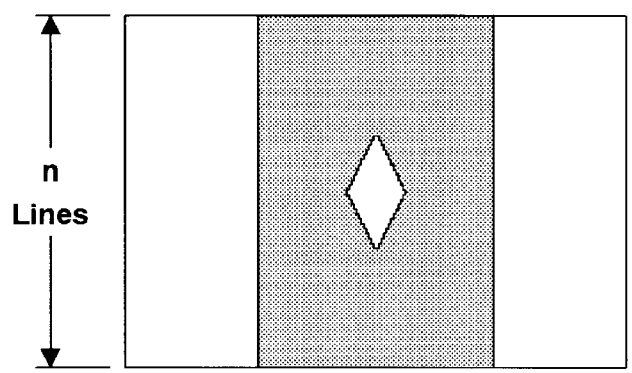
FIG. 4(b) shows an image signal of which a shaded area is enlarged two-times in the vertical direction of the shaded area shown in FIG. 4(a). The image signal is outputted from the field memory.
Figure 4C:
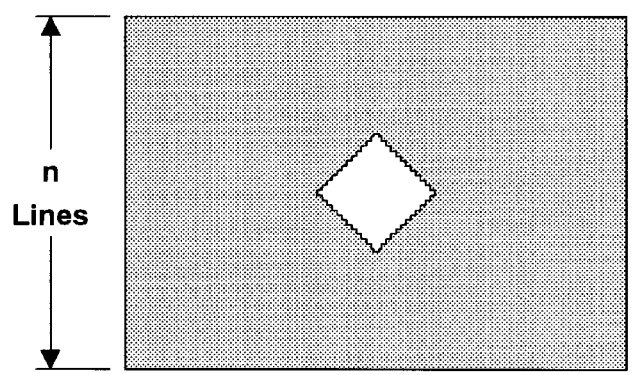
FIG. 4(c) shows an image signal of which a shaded area is enlarged two-times in the horizontal direction of the shaded area shown in FIG. 4(b). The image signal is outputted from a line memory.
Figure 4D:
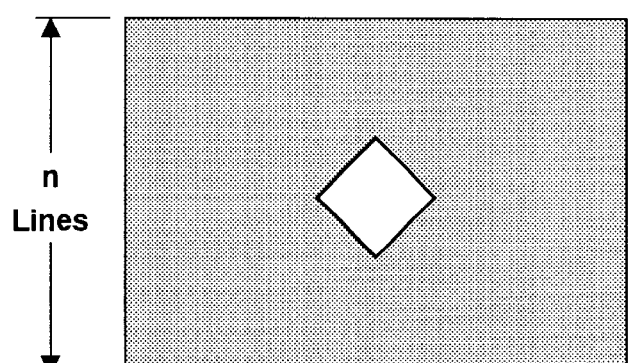
FIG. 4(d) shows an image signal outputted from an interpolation circuit, wherein the image signal shown in FIG. 4(c) is interpolated by the interpolation circuit.

The image signal obtained as mentioned above is processed sequentially with an interpolation process by the interpolation circuit 14 and a video signal of one field, which is processed with the interpolation process in the horizontal and vertical directions of the picture as shown in FIG. 4(d), is produced.

As mentioned above, the electronic zooming circuit according to the present invention performs different signal processing in accordance with a magnification of electronic zooming whether a zooming magnification is less than 2 times or more than 2 times. In a case that a zooming magnification is less than 2 times, the memory 12 is not utilized. In a case that a zooming magnification is more than 2 times, the memory 12 is utilized. In addition thereto, an image signal of a same line outputted from the CCD 10 is written so as to overwrite the image signal of the same line and an image signal, which is not necessary to write, is not written, so that a recording capacity of the memory 12 can be reduced to one quarter of that of the field memory 32 in the prior art.

While the invention has been described above with reference to specific embodiments thereof, it is apparent that many changes, modifications and variations in the arrangement of equipment and devices and in materials can be made without departing from the invention concept disclosed herein. For example, in the embodiment of the present invention explained above, a zooming magnification in the vertical direction of a video signal outputted from the CCD 10 is limited to less than 2 times. However, in a case that a zooming magnification of the CCD 10 in the vertical direction of a picture is limited to less than 3 times, a recording capacity of the memory 12 can be reduced to one ninth of that of the field memory 32 in the prior art by performing a different signal processing in accordance with a zooming magnification whether the zooming magnification is less than 3 times or more than 3 times.

Accordingly, with assuming that a maximum zooming magnification in the vertical direction of a video signal outputted from the CCD 10, that is, a number of lines in one field is "N" and a minimum number of lines, which is controlled to be outputted from the CCD 10 not so as to duplicate during a period of one field, is "M", a memory capacity of the memory 12 can be reduced to $(M/N)^2$ of that of the field memory 32 in the prior art by changing a value of N/M, that is, a zooming magnification, where "M" and "N" are respectively a natural number and "M" is smaller than "N".

Further, in a case of performing an electronic zooming by utilizing the memory 12, it is possible to make a control of camera-shake compensation while reading out an image signal from the memory 12 and to make a control such as automatic focusing and white balancing by utilizing an image signal written in the memory 12. Furthermore, an image signal can maintain sufficient accuracy even though the image signal is processed by a zooming magnification of more than 10 times in maximum.

According to the aspect of the present invention, there provided an electronic zooming circuit, which performs a different zooming process in accordance with a zooming magnification of the electronic zooming whether the zooming magnification is less than N/M times or more than N/M times. In a case that the zooming magnification is less than N/M times, the memory 12 is not utilized. In a case that the zooming magnification is more than N/M times, a recording capacity of the memory 12 can be set to $(M/N)^2$ times that of a 1-field memory because only image signals of pixels equivalent to a predetermined horizontal range in image signals of "M" lines, which are presented in image signals of "N" lines in total outputted from the solid state image sensing device or the CCD 10 without overlapping each other, are written in the memory 12.

According to another aspect of the present invention, there provided an electronic zooming circuit, which does not utilize the memory 12, if a zooming magnification is less than 2 times. In a case that the zooming magnification is more than 2 times, a recording capacity of the memory 12 can be set to ¼ times that of a 1-field memory, because only image signals of pixels equivalent to a predetermined horizontal range in image signals of "M" lines, which are presented in image signals of "N" lines in total outputted from the solid state image sensing device or the CCD 10 without overlapping each other, are written in the memory 12. In addition thereto, the electronic zooming circuit according to the present invention can maintain high-grade image quality even though the zooming magnification is less than 2 times.

What is claimed is:

1. An electronic zooming circuit for obtaining an enlarged image from an original image in which one field is formed by N lines by enlarging only an area within predetermined horizontal and vertical ranges of the original image, said electronic zooming circuit comprising:

a solid state image sensing device outputting a video signal of N lines in total within a period of one field by outputting repeatedly a video signal of lines, wherein a number of lines to be read out within the period of one field is arbitrarily designated between said N lines and M lines, which is smaller than said N lines;

a memory in which said video signal of N lines outputted from said solid state image sensing device is written without duplication and read out;

a line memory in which one line of said video signal outputted from either said solid state image sensing device or said memory is written and read out; and an interpolation circuit for obtaining said enlarged image by interpolating said video signal read out from said line memory in the horizontal and vertical directions, said electronic zooming circuit further comprising a first operation mode in which zooming magnification is less than N/M magnifications and a second operation mode in which said zooming magnification exceeds N/M magnifications, said electronic zooming circuit is further characterized in that said interpolation circuit conducts an interpolation process in said first operation mode by sequentially supplying a video signal of some lines exceeding said M lines read out from said solid state image sensing device to said line memory without writing in said memory, and that said interpolation circuit conducts an interpolation process in said second operation mode by sequentially writing a video signal of said M lines, which is read out from said solid state image sensing device and stored in said memory once, in said line memory, wherein some or all of said video signal of M lines once stored in said memory are read out from said memory.

2. The electronic zooming circuit in accordance with claim 1, wherein a value of said N/M is 2.

3. The electronic zooming circuit in accordance with claim 1, wherein a video signal within a predetermined vertical range corresponding to said zooming magnification in said video signal of M lines is read out from said memory in said second operation mode.

* * * * *